US008625057B2

(12) United States Patent
Huang et al.

(10) Patent No.: US 8,625,057 B2
(45) Date of Patent: Jan. 7, 2014

(54) COLOR FILTER SUBSTRATE, MULTI-VIEW LIQUID CRYSTAL DISPLAY APPARATUS AND METHOD OF MANUFACTURING THE SAME THEREOF

(75) Inventors: Chien-Chih Huang, Tainan County (TW); Kuo-Sheng Lin, Tainan County (TW); Cheng-Jen Chu, Tainan County (TW)

(73) Assignee: Chimei Innolux Corporation, Miao-Li County (TW)

( * ) Notice: Subject to any disclaimer, the term of this patent is extended or adjusted under 35 U.S.C. 154(b) by 1064 days.

(21) Appl. No.: 12/633,134

(22) Filed: Dec. 8, 2009

(65) Prior Publication Data
US 2010/0141877 A1    Jun. 10, 2010

(30) Foreign Application Priority Data
Dec. 8, 2008   (TW) .............................. 97147685 A

(51) Int. Cl.
*G02F 1/1335* (2006.01)
*G02F 1/1333* (2006.01)
*G02F 1/13* (2006.01)

(52) U.S. Cl.
USPC ................ 349/106; 349/110; 349/187; 430/7

(58) Field of Classification Search
USPC ................................ 349/106, 110, 187; 430/7
See application file for complete search history.

(56) References Cited

U.S. PATENT DOCUMENTS

| 6,859,244 B2 * | 2/2005 | Kawase et al. | 349/106 |
| 7,924,373 B2 * | 4/2011 | Louwsma | 349/106 |
| 2010/0085517 A1 * | 4/2010 | Hong | 349/106 |

* cited by examiner

*Primary Examiner* — Huyen Ngo
(74) *Attorney, Agent, or Firm* — Lowe Hauptman & Ham, LLP

(57) ABSTRACT

A color filter substrate for multi-view displaying including a substrate, a light shielding-layer, and a color filter layer is provided. The substrate has a first surface, a second surface, and a plurality of concaves. The first surface is opposite to the second surface. The concaves are located at the first surface. The light-shielding layer disposed on the first surface of the substrate defines a plurality of light-transparent openings. The color filter layer has a plurality of sub-pixel areas including at least one first sub-pixel area and at least one second sub-pixel area. A first light is transmitted to a first viewer by passing through one of the light-transparent openings and one of the at least one first sub-pixel area, and simultaneously, a second light is transmitted to a second viewer by passing through the same one of the light-transparent openings and one of the at least one second sub-pixel area.

15 Claims, 10 Drawing Sheets

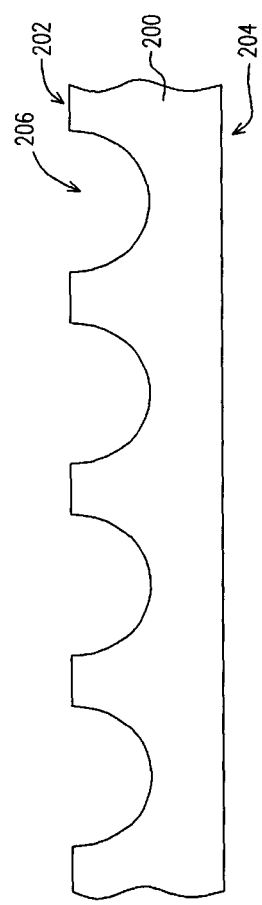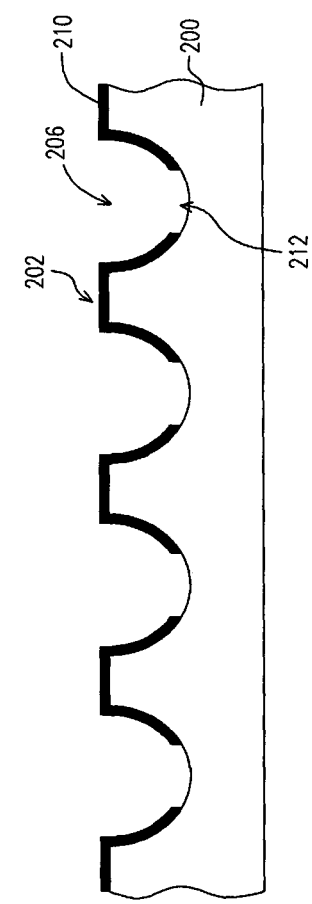
FIG. 2A
FIG. 2B

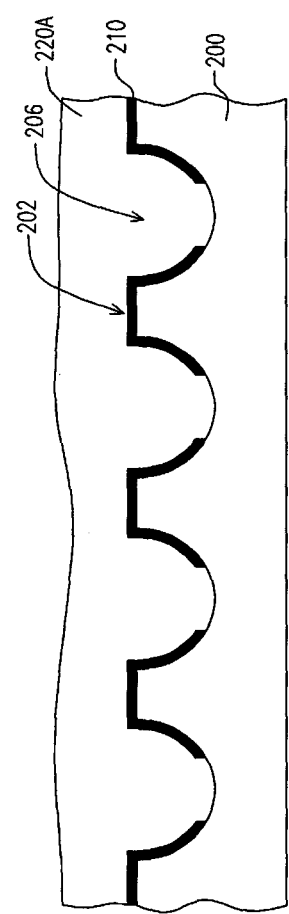
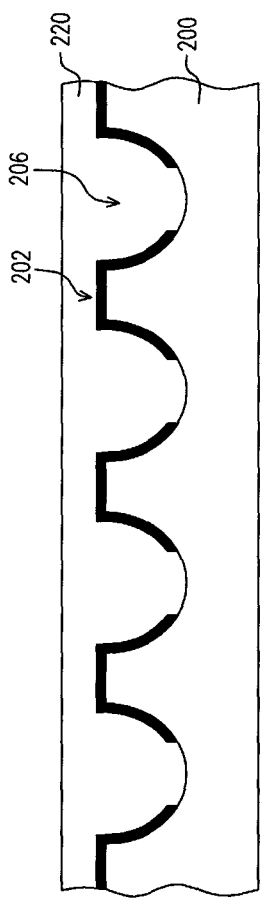
FIG. 2C
FIG. 2D

COLOR FILTER SUBSTRATE, MULTI-VIEW LIQUID CRYSTAL DISPLAY APPARATUS AND METHOD OF MANUFACTURING THE SAME THEREOF

BACKGROUND OF THE INVENTION

1. Field of the Invention

The invention relates to a liquid crystal display (LCD) apparatus, a color filter substrate, and a method of manufacturing the same thereof and particularly relates to a multi-view LCD apparatus, a color filter substrate, and a method of manufacturing the same thereof.

2. Description of Related Art

Owing to the characteristics of power saving, small volume, etc., an LCD is applied to the displays in automobiles and the global positioning system (GPS) assembled in automobiles for displaying the programs and the maps. Nevertheless, if the driver uses the GPS, the passengers are incapable of watching the programs. To resolve the problem, a dual-view LCD is provided.

FIG. 1A is a schematic cross-sectional view of a conventional dual-view LCD panel. Referring to FIG. 1A, the dual-view LCD panel 100 includes a color filter substrate 110, an active device array substrate 120, and a liquid crystal layer 130. The liquid crystal layer 130 is disposed between the color filter substrate 110 and the active device array substrate 120. By forming an electric field between the color filter substrate 110 and the active device array substrate 120, the orientation of the liquid crystal molecules in the liquid crystal layer 130 is controlled to determine a light passing through the LCD panel 100 or not.

Particularly, the design of the color filter substrate 110 makes the dual-view liquid crystal panel 100 display different images in different viewing-angle. The color filter substrate 110 includes a glass substrate 110a, a light-shielding layer 110b, an overcoat layer 110c, a black matrix 110d, a color filter layer 110e, and a common electrode 110f, wherein the black matrix 110d defines first pixel areas 110a and second pixel areas 112b which respectively emit a first light L1 and a second light L2 with different image information.

By the disposition of the light-shielding layer 110b, the first light L1 and the second light L2 with different image information are transmitted in different direction so as to display different images in different directions. That is to say, a first viewer V1 and a second viewer V2 would see different images. However, the light L3 and the light L4 emitted from the second pixel area 112b may interfere with the light L1 emitted from the first pixel area 112a so that the display quality is negatively influenced, vice versa.

Specifically, FIG. 1B is a schematic optical simulation of the conventional dual-view LCD panel. Referring to FIG. 1B, if the image displayed in the first pixel area 112a is watched from a position of the first viewer V1, a portion of the light emitted from second pixel area 112b is transmitted in the direction of the larger angle (e.g. below −60 degree) to the corresponding position. Similarly, if the image displayed in the second pixel area 112b is watched from a position of the second viewer V2, a portion of the light emitted from first pixel area 112a is transmitted in the direction of the larger angle (e.g. above 60 degree) to the position. It is because that the light L3 and the light L4 emitted from the second pixel area 112b can be transmitted in the direction of the larger angle to the position of the first viewer V1 through the adjacent opening of the light-shielding layer 110b as shown in FIG. 1A. Accordingly, the first viewer V1 receives the image information displayed in the second pixel area 112b. The image light of different pixel areas is interfered with each other if the image is watched in the direction of large angle so as to reduce the display quality. In addition, the overcoat layer 110c must have an extreme thickness to accomplish the dual-view display effect, thereby the thickness of the dual-view LCD panel 100 can not be reduced to meet the thin volume requirement of the market. Moreover, because the thermal expansion coefficient of the overcoat layer 110c and that of the glass substrate 110a are significantly varied, the glass substrate 110a may be bent and deformed when the overcoat layer 110c is thermal-cured so that the manufacturing process of the black matrix 110d, the color filter film 110e, and the common electrode 110f are negatively influenced.

SUMMARY OF THE INVENTION

The invention is directed to a color filter substrate making an LCD apparatus having the color filter substrate perform a multi-view display function and has good display quality.

The invention is directed to a method of manufacturing a color filter substrate for improving the process yield.

The invention is directed to a multi-view LCD apparatus which facilitates multi-view display function and is capable of solving the image interference problem so as to enhance the display quality of the LCD apparatus.

The invention provides a color filter substrate for multi-view displaying, and the color filter substrate is used for simultaneously transmitting a first light and a second light to a first viewer and a second viewer, respectively. The color filter substrate includes a substrate, a light-shielding layer, and a color filter layer. The substrate has a first surface, a second surface, and a plurality of concaves, wherein the first surface is opposite to the second surface, and the concaves are located at the first surface. The light-shielding layer disposed on the first surface of the substrate defines a plurality of light-transparent openings. The color filter layer has a plurality of sub-pixel areas including at least one first sub-pixel area and at least one second sub-pixel area, wherein the first light is transmitted to the first viewer by passing through one of the light-transparent openings and one of the at least one first sub-pixel area, and simultaneously, the second light is transmitted to the second viewer by passing through the same one of the light-transparent openings and one of the at least one second sub-pixel area.

The invention also provides a multi-view LCD apparatus including a color filter substrate, an opposite substrate, and a liquid crystal layer. The liquid crystal layer is disposed between the color filter substrate and the opposite substrate. The color filter substrate includes a substrate, a light-shielding layer, and a color filter layer. The substrate has a first surface, a second surface, and a plurality of concaves, wherein the first surface is opposite to the second surface, and the concaves are located at the first surface. The light-shielding layer disposed on the first surface of the substrate defines a plurality of light-transparent openings. The color filter layer has a plurality of sub-pixel areas including at least one first sub-pixel area and at least one second sub-pixel area, wherein the first light is transmitted to the first viewer by passing through one of the light-transparent openings and one of the at least one first sub-pixel area, and simultaneously, the second light is transmitted to the second viewer by passing through the same one of the light-transparent openings and one of the at least one second sub-pixel area.

In a color filter substrate and the multi-view LCD apparatus according to an embodiment of the invention, the light-transparent openings are located at bottoms of the concaves, and the color filter layer is disposed on the first surface of the substrate.

In a color filter substrate and the multi-view LCD apparatus according to an embodiment of the invention, the light-transparent openings are located between the concaves, and the color filter layer is disposed on the second surface of the substrate.

In a color filter substrate and the multi-view LCD apparatus according to an embodiment of the invention, the color filter layer includes a black matrix and a plurality of color filter films, wherein the black matrix defines the sub-pixel areas, and the color filter films are located within the sub-pixel areas.

In a color filter substrate and the multi-view LCD apparatus according to an embodiment of the invention, a distance between centers of two adjacent sub-pixel areas is P, and a width of each of the light-transparent openings is substantially equal to or smaller than P.

In a color filter substrate and the multi-view LCD apparatus according to an embodiment of the invention, a distance between centers of two adjacent sub-pixel areas is P, and a depth of the concaves covered by the light-shielding layer is substantially equal to or smaller than P.

The invention further provides a method of manufacturing a color filter substrate for simultaneously transmitting a first light and a second light respectively to a first viewer and a second viewer, and the method of manufacturing a color filter substrate includes the following steps. A substrate having a first surface and a second surface opposite to the first surface is provided. A plurality of concaves are formed on the first surface of the substrate. A light-shielding layer is formed on the first surface of the substrate, and the light shielding layer defines a plurality of light-transparent openings. A color filter layer is formed on the substrate. The color filter layer has a plurality of sub-pixel areas including at least one first sub-pixel area and at least one second sub-pixel area, wherein the first light is transmitted to the first viewer by passing through one of the light-transparent openings and one of the at least one first sub-pixel area, and simultaneously, the second light is transmitted to the second viewer by passing through the same one of the light-transparent openings and one of the at least one second sub-pixel area.

In a method of manufacturing a color filter substrate according to an embodiment of the invention, the method of forming the color filter layer includes forming the light-transparent openings at bottoms of the concaves, and disposing the color filter layer on the first surface of the substrate.

In a method of manufacturing a color filter substrate according to an embodiment of the invention, the method of forming the color filter layer includes forming the light-transparent openings between the concaves, and disposing the color filter layer on the second surface of the substrate.

The invention is provided by forming a plurality of concaves on a substrate of a color filter substrate and forming a light-shielding layer on the surface having the concaves. Therefore, the color filter substrate of the invention facilitates a multi-view LCD apparatus to have desirable display quality. In addition, the method of manufacturing the color filter substrate according to the invention does not require the formation of an extreme thick planar layer on the substrate so that the bending and the deformation of the substrate is mitigated so as to improve the process yield, and the thickness of the color filter substrate is significantly reduced. Therefore, the thickness of the LCD apparatus according to the invention is significantly reduced, too.

To make the above and other features and advantages of the present invention more comprehensible, several embodiments accompanied with figures are detailed as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2A to FIG. 2E illustrate steps of manufacturing a color filter substrate according to an embodiment of the invention.

DESCRIPTION OF EMBODIMENTS

Figure 1A:
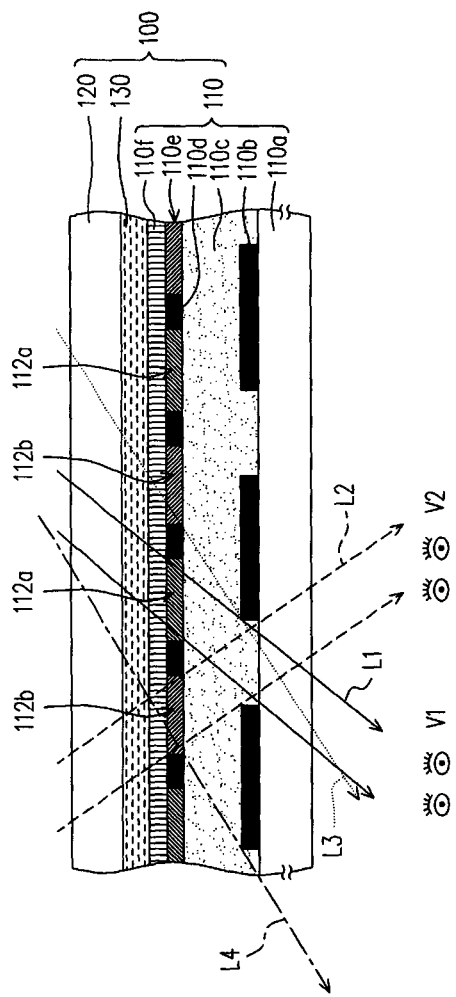
FIG. 1A is a schematic cross-sectional view of a conventional dual-view LCD panel.
Figure 1B:
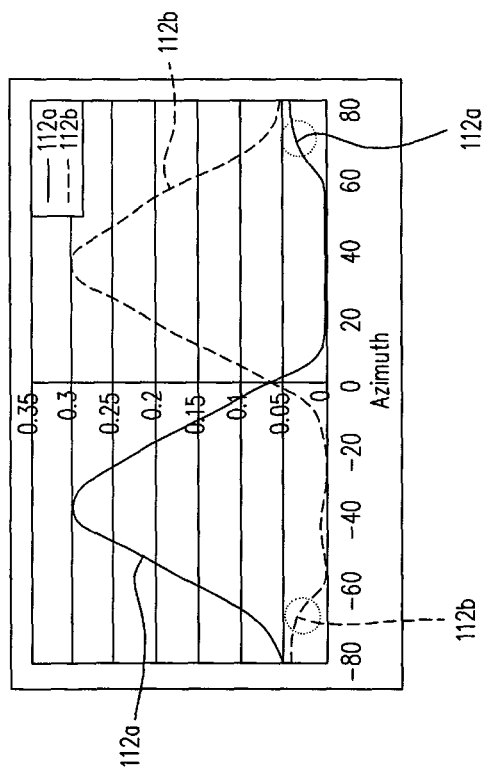
FIG. 1B is a schematic optical simulation of the conventional dual-view LCD panel.

FIG. 2A to FIG. 2E illustrate steps of manufacturing a color filter substrate according to an embodiment of the invention. First, referring to FIG. 2A, a substrate 200 is provided. The substrate 200 has a first surface 202 and a second surface 204 opposite to each other. A plurality of concaves 206 are formed on the first surface 202 of the substrate 200. In the present embodiment, the substrate 200 may be, for example, a glass substrate, a plastic substrate, or other suitable substrates for manufacturing a color filter substrate. The method of forming the concaves 206 includes, for example, performing an etching process. Specifically, the etching process includes an anisotropic etching process or an isotropic etching process.

In the current step, the conditions of the manufacturing process can be adjusted so as to control the shape, the size, and the depth of the concaves 206. For example, the concaves 206 are formed by an anisotropic etching process so as to have arc-like sidewalls as shown in FIG. 2A. In other embodiment, if the concaves 206 are formed by an isotropic etching process, the concaves 206 may have substantially vertical sidewalls. On the other hand, the shapes of the concaves 206 can be a bowl-like shape or a band-like shape if the substrate 200 is viewed from the upper side of the first surface 202. It is noted that the distribution of the concaves 206 can be delta distribution, i.e. two neighboring columns (or rows) of the concaves 206 are interlaced.

Next, referring to FIG. 2B, a light-shielding layer 210 is formed on the first surface 202 of the substrate 200, and the light shielding layer 210 defines a plurality of light-transparent openings 212. The method of forming light-shielding layer 210 includes forming a non-transparent material on the first surface 202 of the substrate 200 by performing a coating process. Thereafter, a photolithographic process is performed to define the patterns of the light-transparent openings 212, and an etching process is performed on the non-transparent material coated on the first surface 202 to form the plurality of the light-transparent openings 212 so that the light-shielding layer 210 is fabricated. The size and the disposition location of the light-transparent openings 212 are changed through the adjustment of the photolithographic process. In FIG. 2B, each light-transparent opening 212 is substantially located at the right center of the bottom of one concave 206. In other embodiments, each light-transparent opening 212 can be located at the location beside the right center of the bottom of one concave 206, the location between two concaves 206, or other locations. If each light-transparent opening 212 is located at the location beside the right center of the bottom of one concave 206, the viewers located at different sides of the multi-view LCD apparatus having the color filter substrate can view at different viewing-angle for the best displayed images so that the color filter substrate can be applied in an automobile display apparatus.

Then, referring to FIGS. 2C and 2D, a planar layer 220 can be formed on the first surface 202 of the substrate 200 for rendering the first surface 202 of the substrate 200 flat in the present embodiment. The method of forming the planar layer 220 includes forming a planar material layer 220A and performing a planarization process, wherein the planar material layer 220A completely fills the concaves 206 and covers the light shielding layer 210. In the process shown in FIG. 2C, the condition of coating the planar material layer 220A on the first surface 202 is difficultly controlled so that the surface of the planar material layer 220A is not exactly flat. Therefore, the planarization process such as a polishing process or a reflow process is required to forming the planar layer 220.

In other embodiments, the method of forming the planar layer 220 can include forming a first planar material layer on the substrate 200 and subsequently forming a second planar material layer on the first planar material layer, wherein the first planar material layer completely fills the concaves 206 and covers the light-shielding layer 210. The second planar material layer formed on the first planar material layer with poor surface planarity can have better surface uniformity. Substantially, a material of the planar layer 220 can be transparent material, and the refraction index of the planar layer 220 can be similar or equivalent to that of the substrate 200.

Figure 2E:
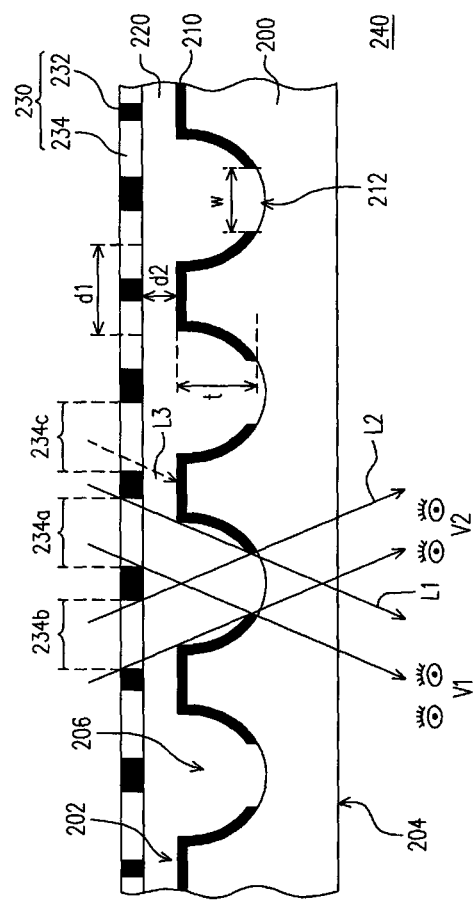

Next, referring to FIG. 2E, a color filter layer 230 is formed on the substrate 200 to complete the color filter substrate 240. In the present embodiment, the light-transparent openings 212 are located at the bottoms of concaves 206, and the color filter layer 230 is formed on the first surface 202 of the substrate 200. The method of forming the color filter layer 230 includes forming a black matrix 232 on the first surface 202 of the substrate 200 and subsequently forming a plurality of color filter films 234 in at least one first sub-pixel area 234a and at least one second sub-pixel area 234b defined by the black matrix 232. It is noted that the formation sequence of the black matrix 232 and the color filter films 234 is not restricted by the aforesaid description, and the formation sequence of the black matrix 232 and the color filter films 234 can be varied and are not listed herein. In an embodiment, the color filter films 234 include red filter films, green filter films or blue filter films.

The color filter substrate 240 includes the substrate 200, the light-shielding layer 210, and the color filter layer 230. The substrate 200 has the first surface 202, the second surface 204, and the concaves 206, wherein the first surface 202 is opposite to the second surface 204, and the concaves 206 are located at the first surface 202. The light-shielding layer 210 disposed on the first surface 202 of the substrate 200 defines a plurality of light-transparent openings 212. The light-transparent openings 212 are located at the bottoms of the concaves 206 and the color filter layer 230 is disposed on the first surface 202 of the substrate 200. Furthermore, the planar layer 220 can be further disposed between the substrate 200 and the color filter layer 230.

By the light-shielding effect of the light-shielding layer 210, the first light L1 and the second light L2 carry different image information after passing through the first sub-pixel area 234a and the second sub-pixel area 234b, respectively. In addition, the first light L1 and the second light L2 pass through the light-transparent openings 212 in different directions to display two different displayed images. That is to say, a first viewer V1 and a second viewer V2 located at different sides of the color filter substrate 240 would see different images. Furthermore, the light-shielding layer 210 of the present embodiment is conducive to prevent the first viewer V1 or the viewer watching the image in a larger angle from seeing the light L3 emitted from other sub-pixel area such as the sub-pixel area 234c. Therefore, the color filter substrate 240 applied in a multi-view display apparatus is helpful to enhance the display quality thereof. Particularly, the light-transparent openings 212 of the light-shielding layer 210 are formed at the bottoms of the concaves 206 to keep a distance from the color filter layer 230 in the color filter substrate 240 of the present embodiment, so that the planar layer 202 does not necessarily have extreme thickness to accomplish the multi-view function. Accordingly, the bending and the deformation of the substrate 200 causing by the variation between the thermal expansion coefficients of the substrate 200 and the planar layer 220 is prevented so that the subsequent process is not affected and the process yield of the color filter substrate 240 is improved.

For example, when a distance d1 between the centers of two adjacent sub-pixel areas such as sub-pixel areas 234a and 234b, or sub-pixel areas 234b and 234c is P, a width w of each light-transparent opening 212 is substantially smaller than or equal to P, e.g. the width w can be from 2 P/5 to 2 P/3. Moreover, the depth t of the concave 206 covered by the light-shielding layer 210 can be smaller than or equal to P. Owing that the concaves 206 covered by the light-shielding layer 210 is located inside the substrate 200, the increase of the depth t of the concave 206 covered by the light-shielding layer 210 would not increase the thickness of the color filter substrate 240. That is to say, the thickness of the color filter substrate 240 is not increased in order to achieve the multi-view function, which facilitates the thickness miniaturization of the display apparatus.

Specifically, the width w of each light-transparent openings 212 and the partial depth t of the concaves 206 covered by the light-shielding layer 210 can be larger or smaller based on different design requirements. If the color filter layer 230 is disposed on the first surface 202 as shown in the present embodiment, the distance d2 between the color filter layer 230 and the substrate 200 can be from 5 μm to 10 μm. In particular, the opening of each concave 206 in the color filter substrate 240 illustrated in the cross-sectional view of FIG. 2E is corresponding to two sub-pixel areas 234a and 234b so that the color filter substrate 240 can be used in the dual-view display apparatus. Nevertheless, in other embodiments, the opening of each concave 206 can be located corresponding to more than two sub-pixel areas 234a, 234b, 234c . . . so that the color filter substrate 240 can be used in multi-view display apparatus.

Figure 3:
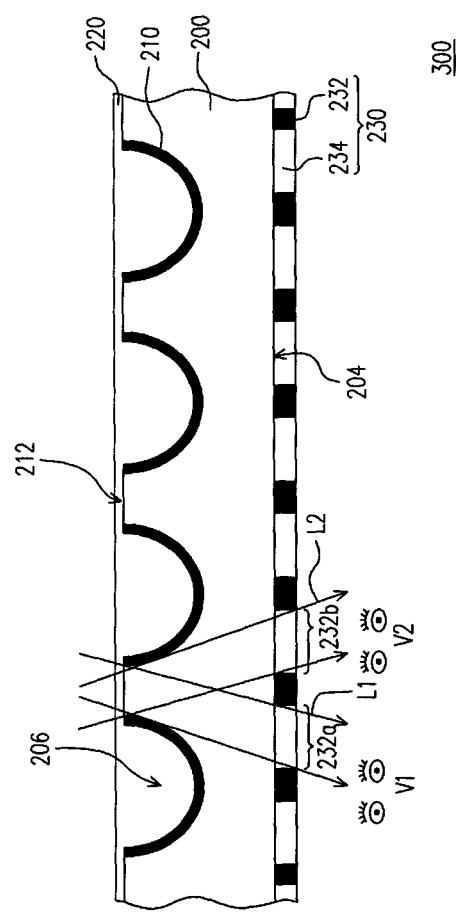
FIG. 3 is a color filter substrate according to another embodiment of the invention.

FIG. 3 is a color filter substrate according to another embodiment of the invention. Referring to FIG. 3, the color filter substrate 300 is similar to the aforesaid color filter substrate 240, so that most of the components of the color filter 300 are substantially the same as those of the color filter substrate 240. Specifically, the difference between the color filter substrate 240 and the color filter substrate 300 is the disposition location of the color filter layer 230. In the color filter substrate 300, the light-transparent openings 212 are located between the concaves 206, and the color filter layer 230 is disposed on the second surface 204 of the substrate 200. In other words, the concaves 206 and the color filter layer 230 are located at two different surfaces of the substrate 200. The color filter substrate 300 can be applied in the dual-view display apparatus, and the color filter substrate 300 having the light-shielding layer 210 is helpful to improve the display quality of the multi-view display apparatus and the process yield thereof, and is further apt to reduce the thickness of the multi-view display apparatus.

According to the color filter substrates 240 and 300 illustrated in FIGS. 2E and 3, the first light L1 and the second light L2 are simultaneously transmitted to the first viewer V1 and the second viewer V2. The first light L1 is transmitted to the first viewer V1 by passing through one of the light-transparent openings 212 and one of the first sub-pixel areas 234a. Meanwhile, the second light L2 is transmitted to the second viewer V2 by passing through the same one of the light-transparent openings 212 and one of the second sub-pixel areas 234b. Accordingly, the color filter substrates 240 and 300 can have multi-view display effect.

Figure 4:
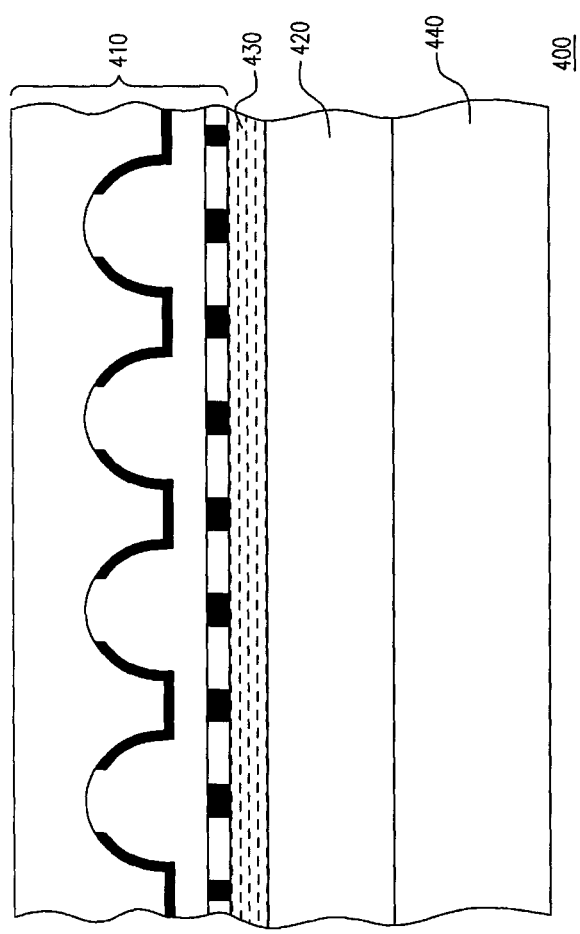
FIG. 4 illustrates a schematic cross-sectional view of an LCD apparatus according to an embodiment of the invention.

FIG. 4 illustrates a schematic cross-sectional view of an LCD apparatus according to another embodiment of the invention. Referring to FIG. 4, an LCD apparatus 400 includes a color filter substrate 410, an opposite substrate 420, and a liquid crystal layer 430. The liquid crystal layer 430 is disposed between the color filter substrate 410 and the opposite substrate 420. The color filter substrate 410 can be selected from one of the color filter substrates 240 and 300 depicted in the foregoing descriptions, and can also be other color filter substrates designed in a manner consistent with the scope of the invention. The opposite substrate 420 can be an active device array substrate. In other embodiments, the color filter substrate 420 may further include an active device array structure. If the LCD apparatus 400 is a transmissive LCD or a transflective LCD, a backlight module 440 can be further included in the LCD apparatus 400, and the color filter substrate 410, the opposite substrate 420, and the liquid crystal layer 430 are disposed above the backlight module 440. The color filter substrate 410 can be any of the color filter substrates described in the aforesaid embodiments, so that the LCD apparatus 400 is a multi-view display apparatus having desirable display quality and high process yield.

Figure 5:
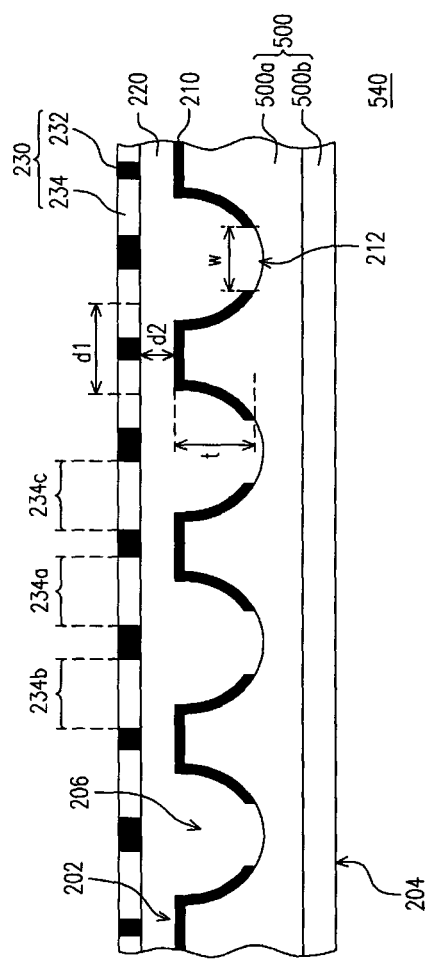
FIG. 5 illustrates a schematic cross-sectional view of a color filter substrate according another embodiment of the invention.
Figure 6:
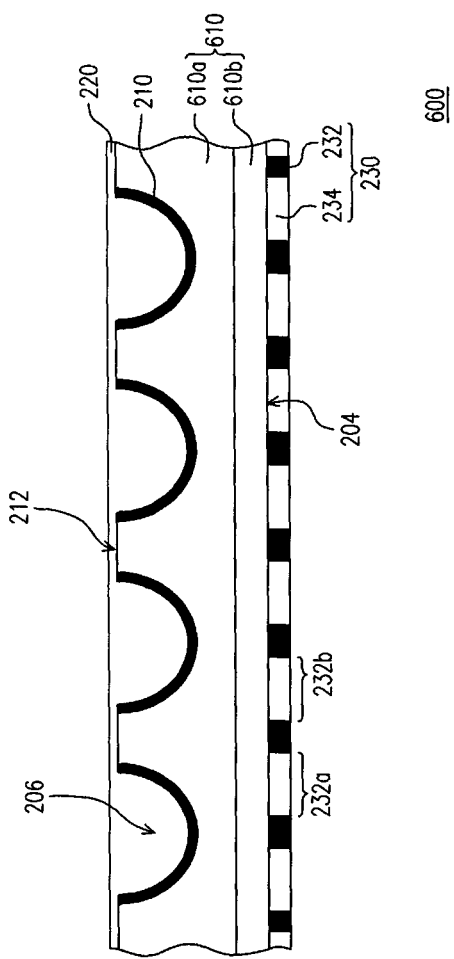
FIG. 6 illustrates a schematic cross-sectional view of a color filter substrate according to further another embodiment of the invention.
Figure 7:
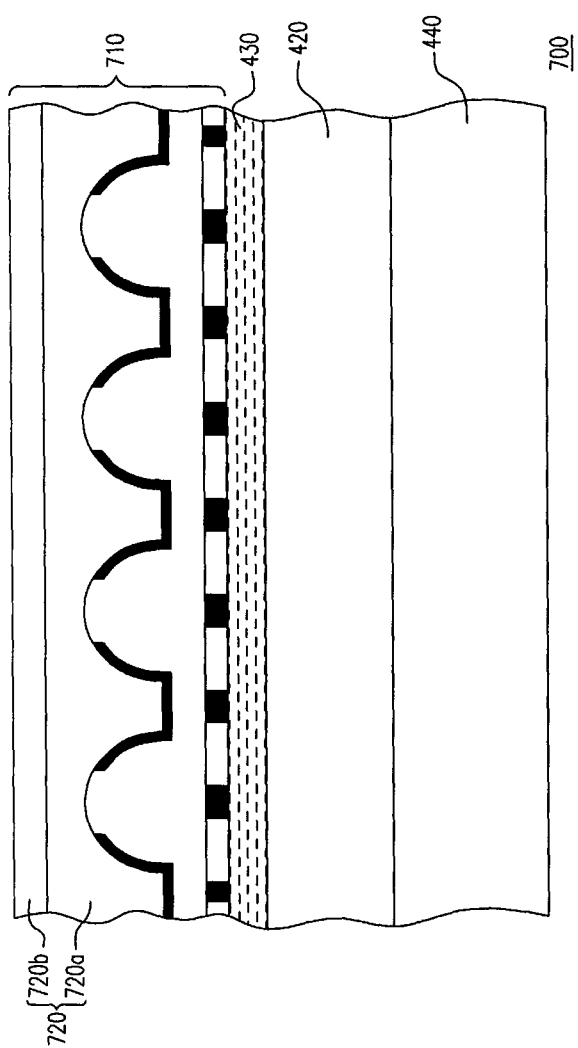
FIG. 7 illustrates a schematic cross-sectional view of an LCD apparatus according to another embodiment of the invention.

A multi-layer substrate can be used during manufacturing the color filter substrate to improve the yield of the color filter substrate. For example, FIG. 5 illustrates a schematic cross-sectional view of a color filter substrate according to further another embodiment of the invention. Referring to FIG. 5, the color filter substrate 540 has similar structure to the color filter substrate 240 illustrated in FIG. 2E. Nevertheless, the substrate 500 can be consisted of the first substrate 500a and the second substrate 500b. The first substrate 500a can be a glass substrate or a plastic substrate and can be fabricated through the foregoing process. The second substrate 500b can be the other glass substrate or the other plastic substrate for supporting the first substrate 500a. Other embodiments can be shown as those illustrated in FIGS. 6 and 7. FIG. 6 illustrates a schematic cross-sectional view of a color filter substrate according to further another embodiment of the invention. FIG. 7 illustrates a schematic cross-sectional view of an LCD apparatus according to another embodiment of the invention. Referring to FIG. 16, the color filter substrate 600 is similar to the color filter substrate 300 illustrated in FIG. 3, but the substrate 610 of the color filter substrate 600 is consisted of a first substrate 610a and a second substrate 610b. In addition, the method of manufacturing the first substrate 610a can be referred to the method of manufacturing the substrate 200 mentioned above, and the second substrate 610b is used to support the first substrate 610a.

Referring to FIG. 7, an LCD apparatus 700 is approximately identical to the LCD apparatus 400. Nevertheless, the substrate 720 of the color filter substrate 710 in the LCD apparatus 700 includes a first substrate 720a and a second substrate 720b. The method of manufacturing the first substrate 720a can be referred to the method of manufacturing the substrate 200 mentioned above. In addition, the second substrate 720b is also used for carrying and supporting the first substrate 720a.

In view of the above, the color filter substrate of the invention accomplish the multi-view display effect by forming the shielding layer having the plurality of light-transparent openings on the substrate having the concaves. Accordingly, the light-shielding layer efficiently separates the light to-be transmitted to different fields of view and prevents the light to-be transmitted to different fields of view from interfering with each other so that the light-shielding layer is apt to improve the display quality of the multi-view LCD apparatus of the invention. When the light-shielding layer is formed on the substrate having the concaves, the light-transparent openings of the light-shielding layer keep a distance from the color filter layer by the substrate. Therefore, the planar layer does not require having extreme thickness to facilitate the multi-view display effect, which is conducive to reduce the thickness of the color filter substrate and enhance the process yield of the color filter substrate. Consequently, the color filter substrate and the LCD apparatus of the invention have desirable display quality and high process yield, and further comply with the thinner volume requirement of the market.

Although the present invention has been disclosed by the above embodiments, they are not intended to limit the present invention. Any person having ordinary knowledge in the art may make some modifications and alterations without departing from the spirit and scope of the present invention. Therefore, the scope for which protection is sought by the present invention falls in the appended claims.

What is claimed is:

1. A color filter substrate for multi-view displaying by simultaneously transmitting a first light and a second light to a first viewer and a second viewer, respectively through the color filter substrate, wherein the color filter substrate comprises:

a substrate having a first surface, a second surface, and a plurality of concaves, wherein the first surface is opposite to the second surface, and the concaves are located at the first surface;

a light-shielding layer disposed on the first surface of the substrate, wherein the light-shielding layer having a plurality of light-transparent openings; and a color filter layer having a plurality of sub-pixel areas comprising at least one first sub-pixel area and at least one second sub-pixel area, wherein the first light is transmitted to the first viewer by passing through one of the light-transparent openings and one of the at least one first sub-pixel area, and simultaneously, the second light is transmitted to the second viewer by passing through the same one of the light-transparent openings and one of the at least one second sub-pixel area.

2. The color filter substrate according to claim 1, wherein the light-transparent openings are located at bottoms of the concaves, and the color filter layer is disposed on the first surface of the substrate.

3. The color filter substrate according to claim 1, wherein the light-transparent openings are located between the concaves, and the color filter layer is disposed on the second surface of the substrate.

4. The color filter substrate according to claim 1, wherein the color filter layer comprises a black matrix and a plurality of color filter films, the black matrix defines the sub-pixel areas, and the color filter films are located within the sub-pixel areas.

5. The color filter substrate according to claim 1, wherein a distance between centers of two adjacent sub-pixel areas is P, and a width of each of the light-transparent openings is smaller than or equal to P.

6. The color filter substrate according to claim 1, wherein a distance between centers of two adjacent sub-pixel areas is P, and a depth of the concaves covered by the light-shielding layer is smaller than or equal to P.

7. A multi-view liquid crystal display (LCD) apparatus, comprising:
a color filter substrate, a first light and a second light simultaneously transmitted to a first viewer and a second viewer respectively through the color filter substrate, wherein the color filter substrate comprises:
a substrate having a first surface, a second surface and a plurality of concaves, wherein the first surface is opposite to the second surface, and the concaves are located at the first surface;
a light-shielding layer disposed on the first surface of the substrate, and the light shielding layer having a plurality of light-transparent openings; and
a color filter layer having a plurality of sub-pixel areas comprising at least one first sub-pixel area and at least one second sub-pixel area, wherein the first light is transmitted to the first viewer by passing through one of the light-transparent openings and one of the at least one first sub-pixel area, and the second light is simultaneously transmitted to the second viewer by passing through the same one of the light-transparent openings and one of the at least one second sub-pixel area;
an opposite substrate; and
a liquid crystal layer disposed between the color filter substrate and the opposite substrate.

8. The multi-view LCD apparatus according to claim 7, wherein the light-transparent openings are located at bottoms of the concaves, and the color filter layer is disposed on the first surface of the substrate.

9. The multi-view LCD apparatus according to claim 7, wherein the light-transparent openings are located between the concaves, and the color filter layer is disposed on the second surface of the substrate.

10. The multi-view LCD apparatus according to claim 7, wherein the color filter layer comprises a black matrix and a plurality of color filter films, the black matrix defines the sub-pixel areas, and the color filter films are located within the sub-pixel areas.

11. The multi-view LCD apparatus according to claim 7, wherein a distance between centers of two adjacent sub-pixel areas is P, and a width of each of the light-transparent openings is smaller than or equal to P.

12. The multi-view LCD apparatus according to claim 7, wherein a distance between centers of two adjacent sub-pixel areas is P, and a depth of each of the concaves covered by the light-shielding layer is smaller than or equal to P.

13. A method of manufacturing a color filter substrate, a first light and a second light simultaneously transmitting to a first viewer and a second viewer respectively through the color filter substrate, and the method of manufacturing a color filter substrate comprising:
providing a substrate having a first surface and a second surface opposite to the first surface;
forming a plurality of concaves on the first surface of the substrate;
forming a light-shielding layer on the first surface of the substrate, and the light shielding layer having a plurality of light-transparent openings; and
forming a color filter layer on the substrate, the color filter layer having a plurality of sub-pixel areas comprising at least one first sub-pixel area and at least one second sub-pixel area, so that the first light is substantially transmitted to the first viewer by passing through one of the light-transparent openings and one of the at least one first sub-pixel area, and simultaneously, the second light is substantially transmitted to the second viewer by passing through the same one of the light-transparent openings and one of the at least one second sub-pixel area.

14. The method of manufacturing a color filter substrate according to claim 13, wherein the method of forming the color filter layer comprises forming the light-transparent openings at bottoms of the concaves, and disposing the color filter layer on the first surface of the substrate.

15. The method of manufacturing a color filter substrate according to claim 13, wherein the method of forming the color filter layer comprises forming the light-transparent openings between the concaves, and disposing the color filter layer on the second surface of the substrate.

* * * * *